2,809,989

PROCESS FOR MAKING d-SACCHARIC ACID

Anthony Truchan, Jr., Skaneateles, N. Y., assignor to Cowles Chemical Company, Cleveland, Ohio, a corporation of Ohio No Drawing. Application March 6, 1956, Serial No. 569,698

10 Claims. (Cl. 260—528)

This invention relates to an improved and economical process for the production of d-saccharic acid which results in surprisingly high yields. d-Saccharic acid is important for its use in pharmaceutical compounds and preparations, and as a food acid. It also has important applications in the resin and plastic industry.

The preparation of d-saccharic acid by the nitric acid oxidation of carbohydrate material is known. Kiliani (Ber. 56, 2022 (1923)) did not obtain more than 18 percent potassium acid saccharate, of theory, by the nitric acid oxidation of d-glucose or starch up to that time. Berichte 58, 2345 (1925) discloses a preferred method for the oxidation of rice starch by nitric acid by which a yield of 23–25 percent of the theoretical was obtained. In this process, 250 grams of rice starch were oxidized with 850 ml. of 20 percent nitric acid over a period of 35 hours and over a range of temperature from 20° C. to 100° C.

U. S. Patent 1,425,605 (August 15, 1922, to Odell), discloses a process for the nitric acid oxidation or carbohydrates to organic acids such as tartaric, saccharic, etc., in the presence of metalliferous catalysts.

U. S. Patent 2,436,659 (February 24, 1948), to Mehltretter also discloses a process involving the nitric acid oxidation of d-glucose to d-saccharic acid. Mustakas et al., Ind. and Eng. Chem., vol. 46 (1954), pgs. 427–34, also describes a process involving the nitric acid oxidation of dextrose to obtain potassium acid saccharate, and Mehltretter et al., J. Agr. Food Chem., vol. 1 (1953), pgs. 779–83 discloses methods for obtaining organic acids by the nitric acid oxidation of carbohydrates, and specifically includes the nitric acid oxidation of dextrose to potassium saccharate.

In accordance with the present invention it has been found that if d-glucose is treated with a member of the group consisting of alkali metal hydroxide, alkaline earth metal hydroxide, and ammonium hydroxide prior to oxidation, that higher yields of saccharic acid can be obtained than heretofore possible. It has been found that ammonium hydroxide gives particularly good results. Moreover, the process is carried out in a shorter period of time, and without the use of metal oxidation catalysts, such as vanadic and molybdic acid salts, which have been found to lower the yields of saccharic acid obtained.

In the preferred embodiment of the invention, ammonium hydroxide is added to a solution of d-glucose and allowed to stand. This resulting glucose solution is added to nitric acid of 50 to 70 percent concentration, while cooking, at a rate which will allow control of the temperature of the solution between 55°–65° C. When 60 to 70 percent nitric acid is used, it is preferred to use reaction temperatures of 60° to 70° C. When lower concentrations of nitric acid are employed, higher reaction temperatures are generally preferred. Agitation and/or cooling are desirable in order to allow more rapid addition of the glucose and thereby to shorten the time of reaction. When conducted in this way, the reaction is quite rapid and smooth, with nearly maximum yields of saccharic acid being obtained in a one-hour period of oxidation. Cooling by vacuum evaporation has also been used satisfactorily as a means of temperature control during the reaction.

In the absence of external cooling, slower addition of the glucose with attendant longer periods of oxidation is desirable in order to maintain the desired reaction temperature.

The invention is not limited to the use of crystalline d-glucose. Concentrated d-glucose sirups or the so-called "70" and "80" corn sugars of commerce, or starch, are also satisfactory sources of carbohydrate for this process. Also, higher concentrations of nitric acid than 70 percent may be used.

It is preferred to use a mole ratio of glucose to nitric acid of 1 to 4, although the invention is not limited to this proportion. A mole ratio of glucose to nitric acid of 1 to 3 lowers the yield of saccharic acid, while a ratio of 1 to 8 increases the yield.

When the oxidation reaction is finished, the liquor is neutralized to a pH of 9.0, with a concentrated solution of potassium hydroxide or carbonate. The slightly alkaline solution is allowed to stand for a short time to insure complete conversion of saccharolactone present to soluble neutral potassium saccharate. Nitric acid, or other mineral acids, are then introduced to adjust the pH of the oxidation liquor between 3.4 and 3.6 when potassium acid saccharate will crystallize out of solution almost immediately. After standing overnight at room temperature, the potassium acid saccharate is filtered or centrifuged and washed with 30 percent ethyl alcohol or cold water. It is easily dried and is of 97 to 100 percent purity.

The potassium acid saccharate is then converted to d-saccharic acid by a well known, conventional method. Two hundred and forty-eight grams (1 mole) of potassium acid saccharate was suspended in 500 ml. of water at 35° C. with continuous stirring and 56 grams (0.5 mole) of calcium chloride in solution in 100 ml. of water was added. A slurry of 39 grams (0.5 mole) of USP calcium hydroxide in 20 ml. of water was next introduced and the temperature of the reaction was maintained at about 40° C. for 1 hour. The calcium saccharate precipitate was removed by filtration, washed with water, and air-dried overnight. A yield of 312 grams (97% of theory) was obtained. Analysis showed the presence of 12.6% calcium. The calculated amount of calcium in calcium saccharic tetrahydrate is 12.5%.

A slurry of 640.5 grams (2 moles) of calcium saccharic tetrahydrate in 1200 ml. of water was gradually added to a stirred solution of 204.6 grams (2 moles) of concentrated sulfuric acid in 1250 ml. of water. After 1 hour the pH of the mixture was 1.4. The precipitated calcium sulfate was removed by filtration and washed with hot water. The combined filtrate and washings were concentrated in vacuo to about 1500 ml. and deposited calcium sulfate was filtered off. The filtrate was analyzed for calcium and sulfate ions. Calculated amounts of oxalic acid and barium hydroxide were then added to remove the soluble calcium sulfate as insoluble calcium oxalate and barium sulfate. The filtrate from these precipitates was a solution of practically pure saccharic acid of about 20% concentration.

This solution was further vacuum evaporated to a thick, light amber colored sirup which contained about 85% d-saccharic acid. Seeding the sirup caused a thick mass of saccharolactone to crystallize. The d-saccharic acid remained in the filtrate.

Evaporation of the filtrate at 60° C., at subatmospheric pressure, to a sufficiently small volume results in the crystallization of potassium nitrate. This compound can be recovered by filtration in fairly pure form. The potassium nitrate filtrate may be returned to the next oxidation run where it is introduced into the nitric acid solution with more glucose. The reactions are advantageously carried out in the presence of small amounts of nitrous acid which is usually present in the nitric acid. The addition of very small quantities of sodium or potassium nitrite will produce sufficient nitrous acid instantaneously.

The process may be carried out continuously by allowing such an amount of nitric acid and glucose to flow into the reaction vessel that the most favorable concentration of acid is maintained. The nitrogen oxide gases emerging from the reaction vessel may be absorbed by known methods and the nitric acid produced recovered for further use.

If it is desired to recover the small amount of oxalic acid formed during the oxidation reaction, it may be removed before or after the removal of potassium acid saccharate by the addition of the calculated amount of calcium carbonate or hydroxide, or soluble calcium salts at pH 1 or higher, but preferably at pH 3.2.

The following specific examples serve to illustrate the more detailed practice of the invention, but the invention is not limited to the said examples:

Example I

Ninety-nine grams of commercial d-glucose monohydrate were dissolved in 40 ml. of distilled water by heating to about 45° C. The resulting solution was cooled to room temperature and 7.0 ml. of concentrated (28.0–30.0 percent ammonia and having a specific gravity of 0.90) ammonium hydroxide were added. This mixture thus obtained was placed in a closed vessel and allowed to stand for a period of about 16½ hours. Twenty-one ml. of this solution was then added to 130 ml. of 69–70 percent nitric acid which had previously been heated to 63° C. The reaction was then initiated by adding one gram of sodium nitrite to the nitric acid mixture and the remainder of the d-glucose solution was added dropwise over a period of 12 minutes while maintaining the reaction temperature between 60° and 65° by external cooling. This mixture was then allowed to react over an additional period of one hour, during which period it was necessary to apply external heat or cooling to maintain the tempertaure between 60° C. and 65° C. After the full reaction time the solution was cooled to room temperature and concentrated (40–50 percent) aqueous potassium hydroxide added to obtain a pH of 11.2; then the mixture was heated to 80° C. for half an hour and then cooled to 30° C. After cooling, concentrated (65–71 percent) nitric acid was added to obtain a pH of 3.4. The solution was then set aside at room temperature for the potassium acid saccharate to precipitate out. The precipitate was filtered, washed with three small portions of water, and air dried. The yield of potassium acid saccharate obtained by separating the crystals thereof precipitated in the foregoing reaction mixture was 84.5 grams of 98.2 percent purity, or 66.9 percent of theory.

Example II

Ninety-nine grams of commercial d-glucose monohydrate were added to 40 ml. of water to form a 71 percent solution of d-glucose. To this solution 0.2 mole of potassium hydroxide was added and the mixture thus obtained was allowed to set overnight, for a period of about 16½ hours. This solution was then added dropwise to 130 ml. of 70 percent nitric acid (to which 0.1 gram of sodium nitrite had been added) and which had previously been heated to 65° C. This mixture was then allowed to react over an additional period of 30 minutes at 65° C., during which period it was necessary to apply external heat or cooling means to maintain a constant temperature. After the full reaction time the solution was cooled to room temperature and concentrated potassium hydroxide solution added to obtain a pH of 9.0; then the mixture heated to 80° C. for half an hour and then cooled to 30° C. After cooling, concentrated (70 percent) nitric acid was added until a pH of 3.4 was obtained. The solution was then set aside at room temperature for the potassium acid saccharate to precipitate out. The precipitate was filtered, washed in three small portions of water, and air dried. The yield of potassium acid saccharate obtained which was obtained by separating the crystals thereof precipitated in the foregoing reaction mixture was 81.5 grams of 96.8 percent purity, or 63.7 percent of theory.

Example III

Ninety-six and five-tenths grams of commercial d-glucose monohydrate (93.2 percent glucose), which had been treated with 0.1 mole of ammonium hydroxide and allowed to stand overnight, were slowly added, with agitation, to 148 ml. of 70 percent technical nitric acid which had previously been heated to 60° C. and to which 0.1 gram of potassium nitrite had been added. The temperature of the reaction mixture was kept at 60° to 65° C. by external cooling during the addition of all of the glucose over a 15-minute period. The solution was stirred 45 minutes more at a temperature of 60° to 65° C. The reaction mixture was immediately cooled to room temperature and concentrated potassium hydroxide solution added to obtain pH 9.0, at a temperature of about 80° C. After cooling the mixture to 15° C., 70 percent nitric acid was introduced with stirring until pH 3.4 was achieved. The solution was cooled to room temperature overnight, and the crystalline potassium acid saccharate was filtered from the mother liquor, washed with cold water, and dried. The yield of potassium acid saccharate obtained by separating the crystals thereof precipitated in the foregoing reaction mixture was 86.0 grams of 98.5 percent purity, or 68.4 percent of theory.

The potassium acid saccharate mother liquor and washings (pH 3.4) were combined and analyzed for oxalic acid content. The main solution was heated to 70° C., and the calculated amount of calcium chloride was added to precepitate the oxalic acid as calcium oxalate at a pH of 3.2. The yield of oxalic acid dihydrate calculated from the calcium oxalate obtained was 3 percent of the weight of glucose used.

Example IV

Forty-five grams of anhydrous d-glucose, which had been treated with 0.06 mole of ammonium hydroxide and allowed to stand overnight, were added in small portions, with stirring, to 94.5 ml. of 50 percent nitric acid at an initial temperature of 70° C. 0.1 gram sodium nitrite was introduced previous to the addition of the glucose. The temperature of the reaction mixture was maintained at 70° to 75° C. with external cooling for 20 minutes, at the end of which time all of the glucose had been added. The cooling was then discontinued and the mixture heated to 90° C. over a 30-minute period. The mixture was cooled to room temperature, and concentrated potassium hydroxide solution was added until pH 9.5 was reached. After 15 minutes, concentrated nitric acid was slowly added to the liquor to obtain pH 3.4. Crystallization of potassium acid saccharate began immediately, and the mixture was allowed to reach room temperature overnight. The precipitated potassium acid saccharate was filtered from the mother liquor, washed with 30 percent alcohol, and dried. Potassium acid saccharate obtained amounted to 42.2 grams of 99.4 percent purity, which corresponds to a yield of 67.6 percent of the theoretical. A potassium analysis gave 15.37 percent (theory 15.75 percent).

Example V

One hundred twenty-eight ml. of 70 percent nitric acid to which 0.1 gram sodium nitrite had been added were heated to 58° C., and 99 grams of d-glucose monohydrate, which had been treated with 0.1 mole of ammonium hydroxide and allowed to stand overnight, were introduced in small portions over a 35-minute interval. The temperature of the reaction was controlled at 58° C. to 60° C. by external cooling and agitation of the mixture. Cooling was discontinued after this time interval, and the temperature of the reaction mixture was allowed to rise to 90° C. through its own heat of reaction over a 30-minute period. The oxidation liquor was immediately cooled to room temperature, and concentrated potassium hydroxide solution was added until pH 10 was obtained. After standing 30 minutes, strong nitric acid was added with stirring until pH 3.5 was reached. The reaction mixture was cooled to room temperature overnight and the crystalline potassium acid saccharate precipitate was filtered and washed with 30 percent ethyl alcohol. The dried potassium acid saccharate weighed 82.3 grams and was 98.5 percent pure. The yield was calculated to be 65.4 percent of the theoretical. A potassium assay gave 15.38 percent (theory 15.75 percent).

*Example VI*

Forty five grams of anhydrous d-glucose, which had been treated with 0.1 mole of ammonium hydroxide and allowed to stand overnight, were added in portions to 96 ml. of 70 percent nitric acid maintained at a temperature of 58° to 60° C. by external cooling and stirring. All of the glucose was added in 15 minutes, and the whole was stirred at 58° to 60° C. for 30 minutes more. The reaction mixture was immediately cooled to room temperature, and potassium hydroxide solution was added to give a pH of 11.0. Nitric acid was added after 30 minutes to pH 3.4. The reaction mixture was cooled to room temperature overnight, when the crystalline potassium acid saccharate precipitate was filtered and washed with 30 percent ethyl alcohol. The dried product weighed 41.4 grams and had a purity of 98.4 percent. The yield was calculated to be 65.5 percent of theory. Analysis showed 15.58 percent potassium to be present (theory 15.75 percent).

*Example VII*

Forty five grams of anhydrous d-glucose, which had been treated with 0.1 mole of ammonium hydroxide and allowed to stand overnight, were added to 80 ml. of 70 percent nitric acid at 55° to 60° C., and the mixture was worked up as in Example VI. The yield of potassium acid saccharate was 62.1 percent of theory.

*Example VIII*

One hundred thirty one and five tenths grams of "70" sugar (68.5 percent glucose) were added, after treating with 0.1 mole of ammonium hydroxide and allowed to stand overnight, in small portions, with stirring, to 148 ml. of technical 61 percent nitric acid at an initial temperature of 60° C. 0.1 gram of sodium nitrate was introduced previous to the addition of glucose. All of the sugar was added in 20 minutes, and the reaction temperature was maintained at 60° to 65° C. for 4 hours with external cooling and stirring. The solution was cooled to room temperature, and strong potassium hydroxide solution was slowly added to obtain a pH of 9.0 and a temperature of about 80° C. After cooling to room temperature, 61 percent nitric acid was added to obtain a pH of the solution of 3.4. The precipitated potassium acid saccharate was allowed to stand overnight at room temperature, and the product was removed from the mother liquor by filtration, washed with cold water, and dried. The yield of potassium acid saccharate thus obtained was 84.6 grams of 98.0 percent purity, or 66.8 percent of theory.

*Example IX*

A glucose sirup, made by dissolving 45 grams of anhydrous glucose in 46 grams of water, was treated with 0.05 mole of ammonium hydroxide and allowed to stand overnight, and was slowly added to 80 ml. of 70 percent nitric acid at 55° to 60° C. All of the sirup was introduced over a half-hour period and the temperature was then allowed to rise spontaneously to 90° C. over another half-hour period. The potassium acid saccharate was isolated in the usual way and was obtained in a yield of 67.4 percent of theory. The yield of oxalic acid dihydrate (isolated as calcium oxalate) was 4 percent of the weight of glucose used.

*Example X*

Ninety nine grams of commercial d-glucose monohydrate were dissolved in 40 ml. of water by heating to about 45° C. The resulting solution was cooled to room temperature and 0.25 gram of solid potassium hydroxide was dissolved into the solution. The mixture thus obtained had a pH between 8–9 and was allowed to stand for a period of 24 hours. This solution was then added dropwise over a period of 15 minutes to 130 ml. of 69–70 percent nitric acid (to which 1.0 gram of sodium nitrite had been added) and which had previously been heated to 65° C. This mixture was then allowed to react over an additional period of one hour between 60°–65° C., during which period it was necessary to apply external heat or cooling to maintain the temperature between 60–65° C. After the full reaction time the solution was cooled to room temperature and concentrated (40–50 percent) potassium hydroxide added to obtain a pH of 9.0; then the mixture was heated to 80° C. for half an hour and then cooled to 30° C. After cooling, concentrated (69–71 percent) nitric acid was added to adjust the pH to 3.4. The solution was then set aside at room temperature for the potassium acid saccharate to precipitate out. The precipitate was filtered, washed with three small portions of water, and air dried. The yield of potassium acid saccharate obtained by separating the crystals thereof precipitated in the foregoing reaction mixture was 58.5 grams of 98.0 percent purity or 46.2 percent of theory.

*Example XI*

Ninety nine grams of commercial d-glucose monohydrate were dissolved in 40 ml. of water by heating to about 45° C. and then cooling the resulting solution to room temperature. Then six grams of reagent grade potassium hydroxide pellets were dissolved in about 10 ml. of water and the resulting solution cooled to room temperature. The caustic solution and the d-glucose solution were then mixed at room temperature. The resulting mixture had a pH of 10.95 and was allowed to stand for a period of one half hour. This solution was then added dropwise over a period of 17 minutes to 130 ml. of concentrated (69–71 percent) nitric acid (to which 1.0 gram of sodium nitrite had been added) and which had previously been heated to 62° C. This mixture was then allowed to react over an additional period of one hour at 60–67° C. during which period it was necessary to apply external heat or cooling to maintain the temperature between 60–67° C. After the full reaction time the solution was cooled to room temperature and concentrated (40–50 percent) aqueous potassium hydroxide added to obtain a pH of 10.6; then the mixture was heated to 80° C. for half an hour and then cooled to 30° C. After cooling, concentrated (69–71 percent) nitric acid was added until a pH of 3.4 was obtained. The solution was then set aside at room temperature for the potassium acid saccharate to precipitate out. The precipitate was filtered, washed with three small portions of water, and air dried. The yield of potassium acid saccharate obtained which was obtained by separating the crystals thereof precipitated in the foregoing reaction mixture was 70.0 grams of 98.2 percent purity or 55.4 percent of theory.

The mother liquor after separating the precipitated potassium acid saccharate had a volume of 430 ml. and was evaporated at 60° C. to a volume of 260 ml. Potassium nitrate crystals precipitated out of the concentrated mother liquor and were separated by filtration and air dried. The yield of potassium nitrate crystals thus obtained was 13.3 grams.

*Example XII*

In this example the mother liquor from Example XI which was obtained after separating the precipitated potassium acid saccharate and potassium nitrate was adjusted to a pH of 10.0 by the addition of a small amount of potassium hydroxide. Ninety nine grams of d-glucose monohydrate were then dissolved in the solution. The resulting mixture was added dropwise to 130 ml. of 69–71 percent nitric acid (to which 1.0 gram sodium nitrite had been added) and which had previously been heated to 85° C. The reaction temperature was maintained between 85° and 90° C. by the application of external cooling or heating as required from time to time. After the full reaction time of one hour the solution was cooled to room temperature and concentrated (40–50 percent) potassium hydroxide solution added to obtain a pH of 9.0; then the mixture was heated to 80° C. for half an hour and then cooled to 40° C. After cooling, concentrated (69–71 percent) nitric acid was added till a pH of 3.4 was obtained. The solution was set aside at room temperature for the potassium acid saccharate to precipitate out. The precipitate was filtered, washed with three 20 ml. portions of cold water, and air dried. The yield of potassium acid saccharate obtained by separating the crystals thereof precipitated in the foregoing reaction mixture was 107.5 grams of 98.1 percent purity, or 85.0 percent of theory.

*Example XIII*

Seven milliliters of concentrated (28.0–30.0 percent $NH_3$ and having a specific gravity of 0.90) ammonium hydroxide was diluted with 75 ml. of distilled water. Ninety grams of anhydrous d-glucose was then dissolved in the dilute ammonium hydroxide solution and the resulting mixture was allowed to set in a closed vessel at room temperature for 16 hours. Then about 20 to 30 ml. of the solution thus obtained was added to 130 ml. of 69–70 percent nitric acid which had previously been heated to 65° C. The reaction was initiated by adding 0.5 gram of sodium nitrite to the nitric acid mixture and then the remainder of the d-glucose solution was added dropwise over a period of 12 minutes while maintaining the reaction temperature between 60 and 65° C. by external cooling. This mixture was then allowed to react over an additional period of one hour, during which period it was necessary to apply heat or cooling to maintain the temperature between 60 and 65° C. After the full reaction time the solution was cooled to room temperature and concentrated (40–50 percent) aqueous potassium hydroxide added to obtain a pH of 11.2; then the mixture was heated to 80° C. for half an hour and then cooled to 30° C. After cooling, concentrated (70 percent) nitric acid was added until a pH of 3.4 was obtained. The solution was then set aside at room temperature for the potassium acid saccharate to precipitate. The precipitate was filtered, washed with three 20 ml. portions of water, and air dried. The yield of potassium acid saccharate obtained by separating the crystals thereof precipitated in the foregoing reaction mixture was 81.8 grams of 99.0 percent purity, or 65.1 percent of theory.

Mole ratios of 1 to 8 (glucose to nitric acid) with 50 percent acid at 70° to 75° C. and 70 percent nitric acid at 55° to 60° C., reacted over one-hour periods, gave yields of potassium acid saccharate of 67.6 and 62.1 percent, respectively.

The examples given above are only intended to illustrate the invention. Various other equivalent reagents and conditions may be used in the examples in accordance with the general disclosure with comparable results.

It is claimed:

1. A process for producing high yields of d-saccharic acid comprising the treatment of a d-glucose solution by the addition of a member of the group consisting of alkali metal hydroxide, alkaline earth metal hydroxide, and ammonium hydroxide, and adding the thus treated solution to nitric acid, maintaining the temperature during the addition at 50–90° C., the ratio of nitric acid to glucose in the reaction mixture being about 3–8 moles of nitric acid per mole of glucose, the nitric acid concentration in the reaction mixture being about 50 to 70 percent, and recovering d-saccharic acid from the reaction mixture.

2. The process recited in claim 1, in which the d-glucose has been treated by the addition of ammonium hydroxide.

3. The process recited in claim 1, in which the d-glucose has been treated by the addition of potassium hydroxide.

4. The process recited in claim 1, in which the d-glucose has been treated by the addition of sodium hydroxide.

5. The process recited in claim 1, in which the d-glucose has been treated by the addition of lithium hydroxide.

6. The process recited in claim 1, in which the d-glucose has been treated by the addition of cesium hydroxide.

7. The process recited in claim 1, in which the d-glucose is crystalline d-glucose.

8. The process recited in claim 1, in which the mole ratio of d-glucose to nitric acid is 1 to 8.

9. The process recited in claim 1 in which the nitric acid is preheated and the treated d-glucose is added in increments over a period of about 15 to 35 minutes.

10. The process recited in claim 1 in which the temperature is maintained at below 70° C. during the addition of glucose, and thereafter raised above 70° C.

References Cited in the file of this patent

UNITED STATES PATENTS 2,436,659    Mehltretter _____ Feb. 24, 1948

OTHER REFERENCES

Mehltretter et al.: J. Agr. Food Chem., vol. I (1953), pp. 779–83.

Mustakas et al.: Ind. and Eng. Chem., vol. 46 (1954), pp. 427–34.